United States Patent [19]

Bambacigno et al.

[11] Patent Number: 5,372,772

[45] Date of Patent: * Dec. 13, 1994

[54] METHOD FOR ENTOMBMENT OF CONTAINER IN CONCRETE

[75] Inventors: Ralph Bambacigno, Modesto; Thomas R. Lindquist, Denair, both of Calif.

[73] Assignee: Convault, Inc., Denair, Calif.

[ * ] Notice: The portion of the term of this patent subsequent to May 2, 2006 has been disclaimed.

[21] Appl. No.: 171,241

[22] Filed: Dec. 20, 1993

Related U.S. Application Data

[60] Continuation of Ser. No. 888,413, May 21, 1992, abandoned, which is a continuation of Ser. No. 541,004, Jun. 20, 1990, abandoned, which is a continuation-in-part of Ser. No. 298,548, Mar. 9, 1989, Pat. No. 4,963,082, which is a division of Ser. No. 118,919, Nov. 16, 1987, Pat. No. 4,826,644, which is a continuation-in-part of Ser. No. 936,205, Dec. 1, 1986, abandoned.

[51] Int. Cl.$^5$ ............................................. B28B 1/14
[52] U.S. Cl. ............................ 264/278; 264/279; 264/279.1; 264/308
[58] Field of Search ............... 264/32, 34, 35, 275, 264/278, 256, 261, 263, 279, 279.1, 71, 333, 308; 52/169.6, 169.7, 249, 741.1, 268, 269, 135, 128; 220/565, 454

[56] References Cited

U.S. PATENT DOCUMENTS

| | | |
|---|---|---|
| 207,570 | 8/1878 | Bibber . |
| 633,804 | 9/1899 | Chamberlain . |
| 843,314 | 2/1907 | Waters . |
| 1,153,535 | 9/1915 | Babich . |
| 1,180,367 | 4/1916 | Babich . |
| 1,185,614 | 6/1916 | Babich . |
| 1,203,533 | 10/1916 | Graham . |
| 1,219,789 | 3/1917 | Splater . |
| 1,267,495 | 5/1918 | Babich . |
| 1,355,122 | 10/1920 | Bintliff ............................ 264/35 |
| 1,476,421 | 12/1923 | Rowland . |
| 1,483,341 | 2/1924 | Fitch . |
| 1,631,239 | 6/1927 | Zengerl . |
| 1,958,487 | 5/1934 | Moran ........................ 220/565 X |
| 2,083,491 | 6/1937 | Chaffee . |
| 2,090,844 | 8/1937 | Kirby . |
| 2,136,390 | 11/1938 | McHugh . |
| 2,777,295 | 1/1957 | Bliss et al. ..................... 220/445 X |
| 3,130,520 | 4/1964 | Newman, Jr. . |
| 3,151,416 | 10/1964 | Eakin et al. ....................... 264/35 |
| 3,206,900 | 9/1965 | Doyle et al. . |
| 3,439,461 | 4/1969 | Chandler et al. . |
| 3,464,175 | 9/1969 | Akita et al. ...................... 52/249 |
| 3,471,599 | 10/1969 | Archer ............................ 264/32 |
| 3,562,977 | 2/1971 | Alleaume ....................... 52/249 X |

(List continued on next page.)

FOREIGN PATENT DOCUMENTS 36631 of 1886 Germany .
5699 of 1894 United Kingdom .

Primary Examiner—Karen Aftergut
Attorney, Agent, or Firm—Townsend and Townsend

[57] ABSTRACT

A storage vault (2, 182) includes an inner tank (4,4',152,180) entombed within a concrete outer tank (8) by first erecting a pair of sidewall forms (51) on a base plate (44) to create an open-top enclosure (54). The inner tank (180) can include a plastic tank (152) enclosed within an external framework (154), the combination (150) housed within a steel tank (174). A layer of concrete (56) is poured onto the base plate, the inner tank is lowered onto the layer of concrete, and concrete is poured into the enclosure to entomb the inner tank while the bottom layer of concrete is still wet. Reinforced hold-down bars (86) extend over the top of the enclosure and have downwardly extending hold-down tubes (92) which engage the top of the inner tank and keep the inner tank positioned horizontally and vertically. The hold-down bars are fastened to the base plate to keep the inner tank properly positioned. After the concrete has set sufficiently, the hold-down bars and tubes are removed and the holes created by the hold-down tubes are filled with concrete. After curing, the wall forms and base plate are removed from the vault created within the form assembly.

19 Claims, 7 Drawing Sheets

U.S. PATENT DOCUMENTS

| | | | |
|---|---|---|---|
| 3,791,164 | 2/1974 | Laverman | 220/414 |
| 3,822,520 | 7/1974 | Crom, Jr. | |
| 3,848,765 | 11/1974 | Durkop | 220/414 |
| 4,183,221 | 1/1980 | Yamamoto | 220/901 X |
| 4,224,265 | 9/1980 | Pfisterer | |
| 4,366,654 | 1/1983 | Bomhard | 52/224 |
| 4,372,906 | 2/1983 | del Valle | 264/279.1 X |
| 4,387,491 | 6/1983 | Schaaf et al. | |
| 4,494,352 | 1/1985 | Leemhuis | 264/256 X |
| 4,513,550 | 4/1985 | Kotcharian | 52/249 |
| 4,519,415 | 5/1985 | Carn | 220/565 X |
| 4,552,166 | 11/1985 | Chadbourne, Sr. et al. | 137/587 X |
| 4,715,307 | 12/1987 | Thompson | 264/256 X |
| 4,826,644 | 5/1989 | Lindquist et al. | 264/71 |
| 4,934,122 | 6/1990 | Lindquist | 264/31 X |
| 5,157,888 | 10/1992 | Lindquist | |
| 5,234,191 | 8/1993 | Bambacigno et al. | |

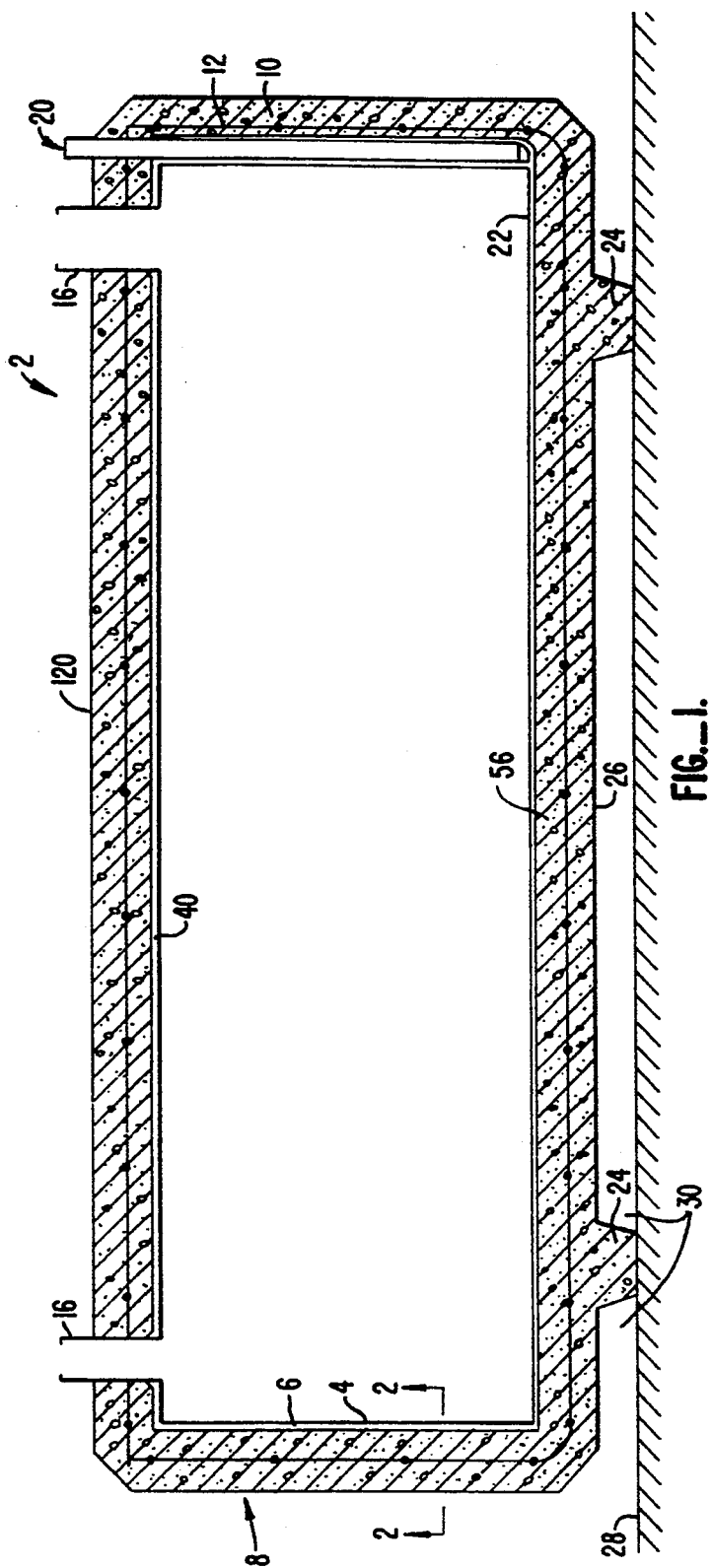
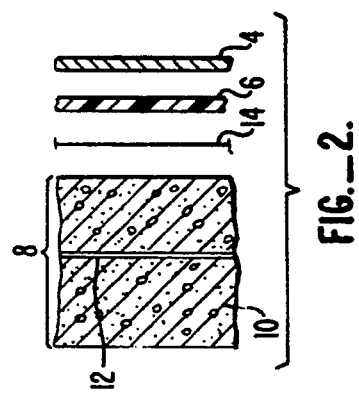

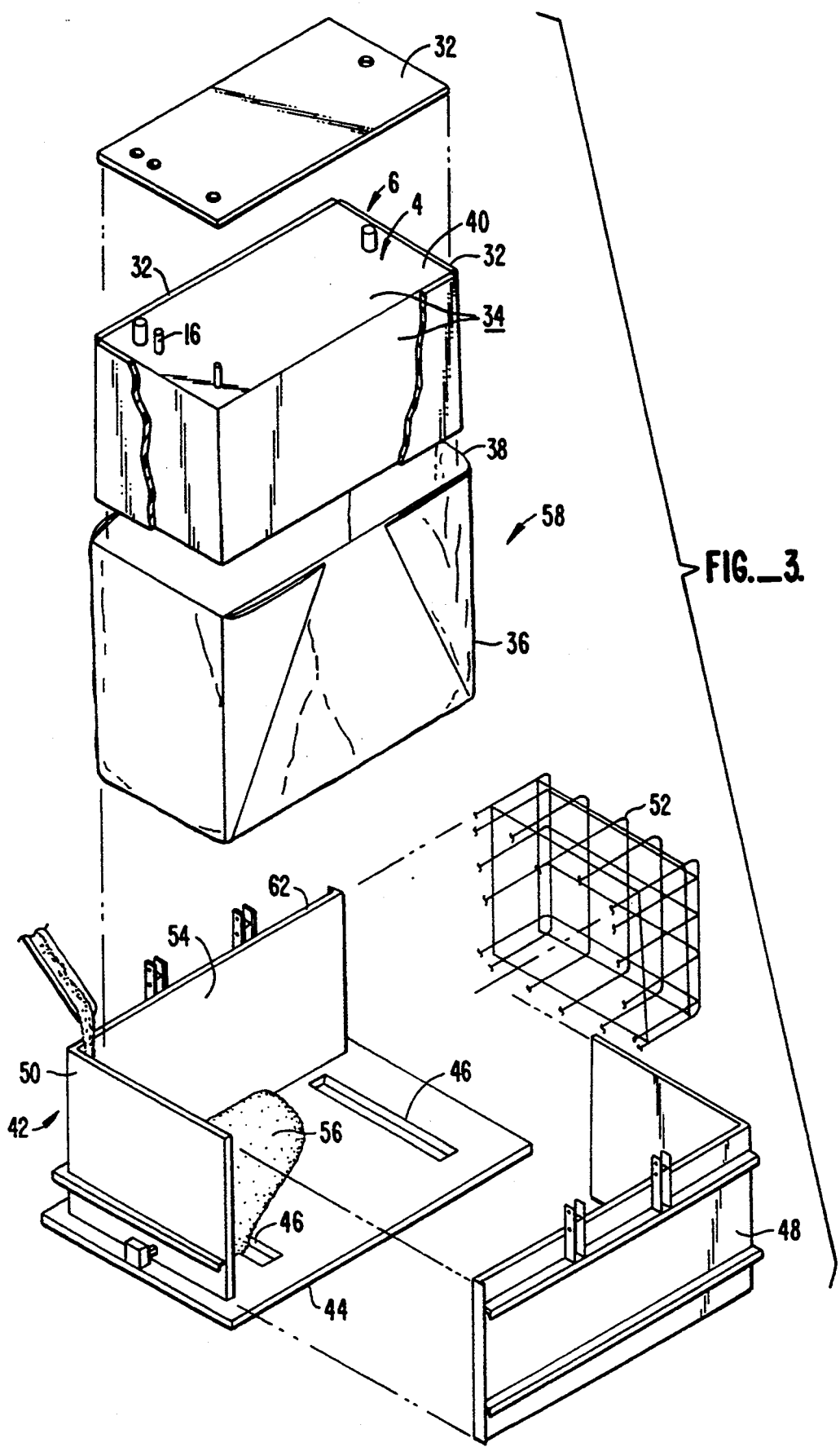

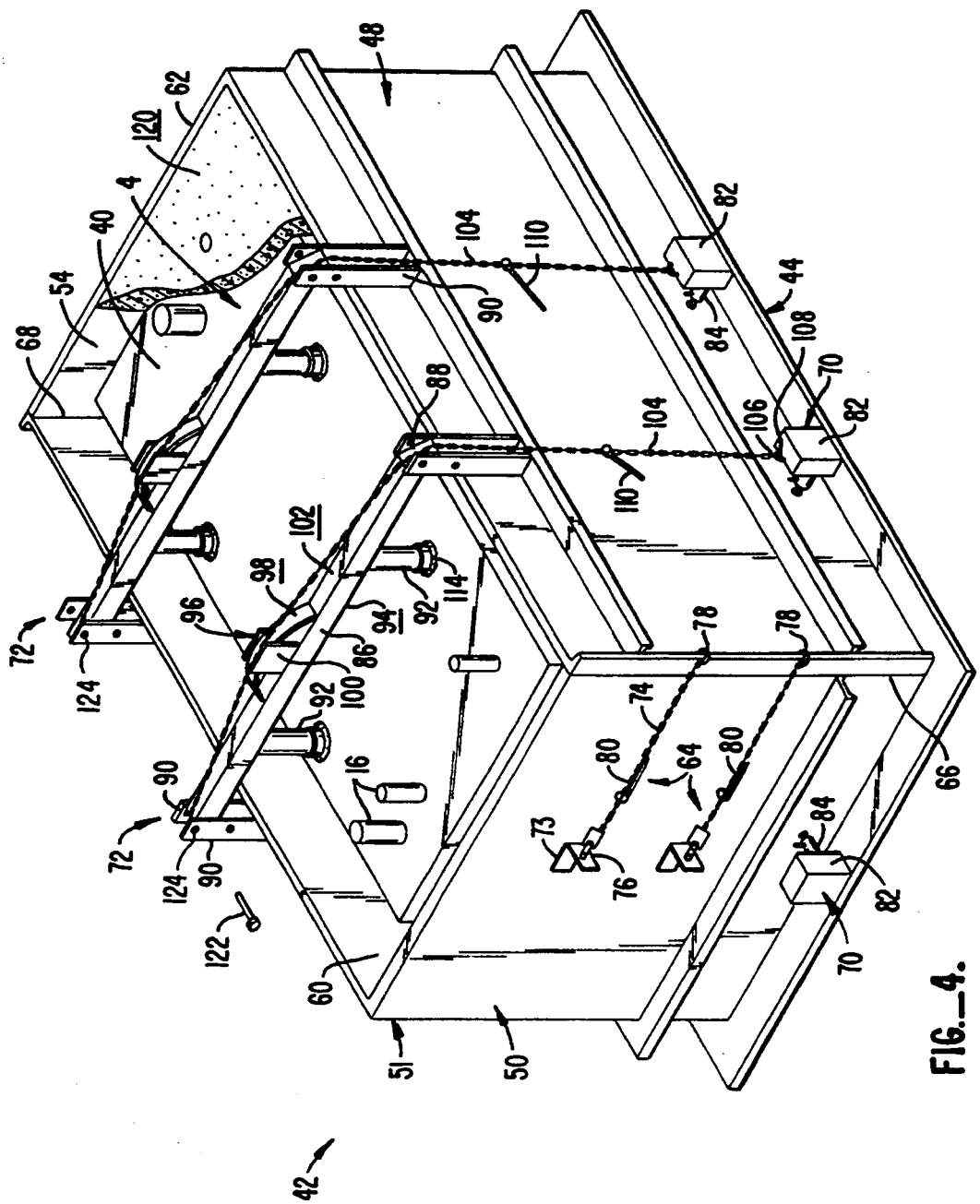
FIG._4.

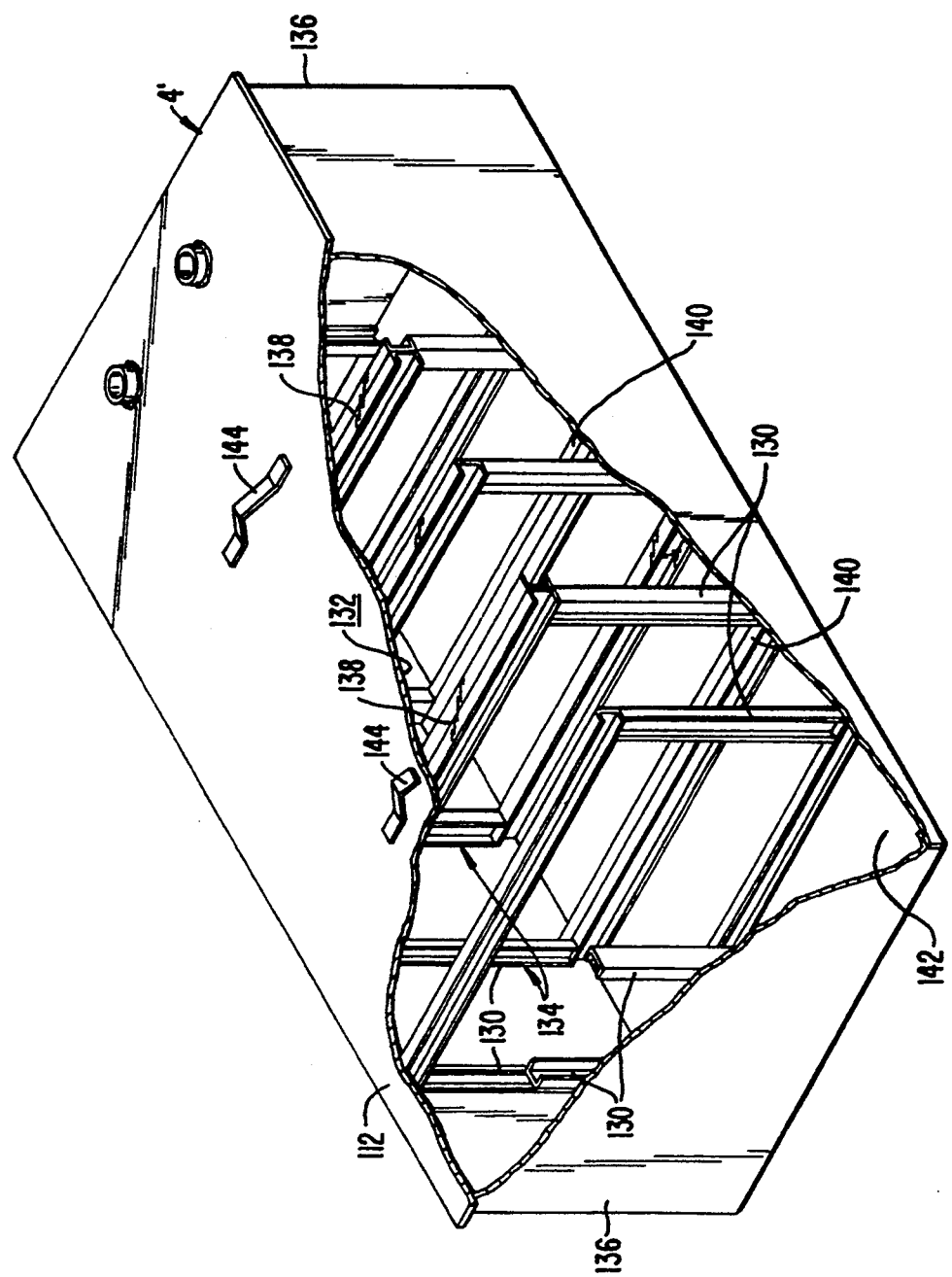
FIG._5.

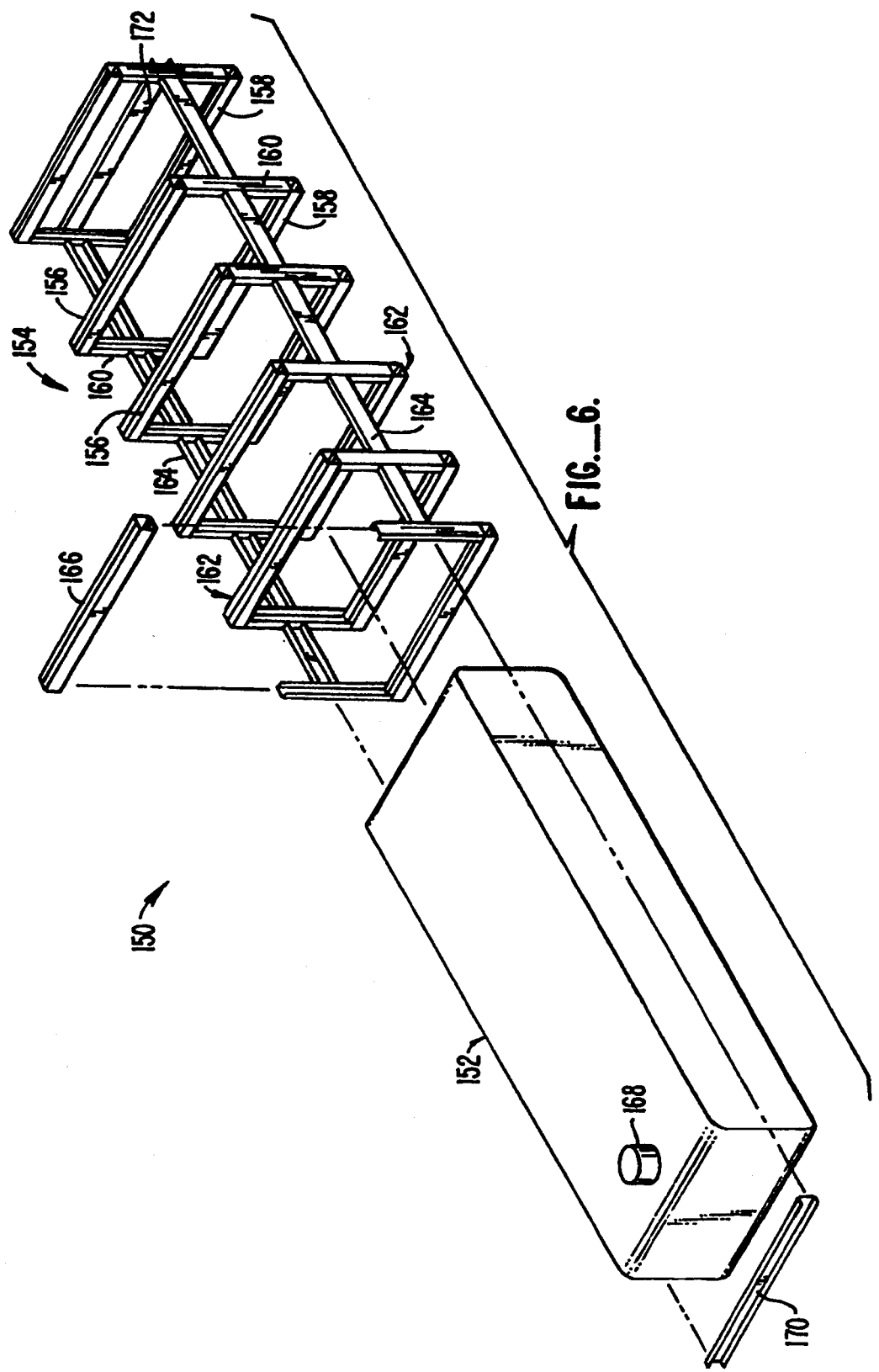
FIG._6.

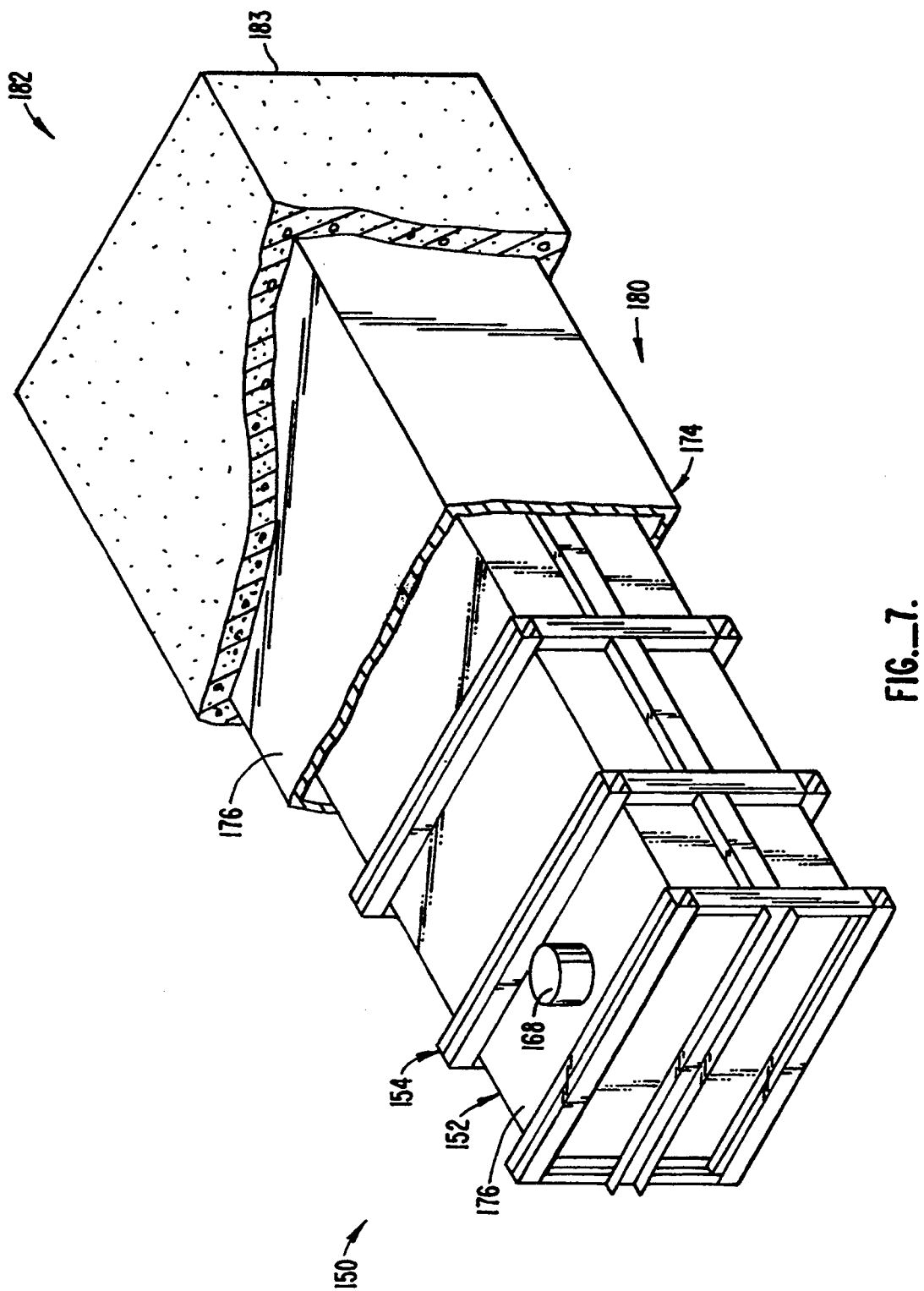

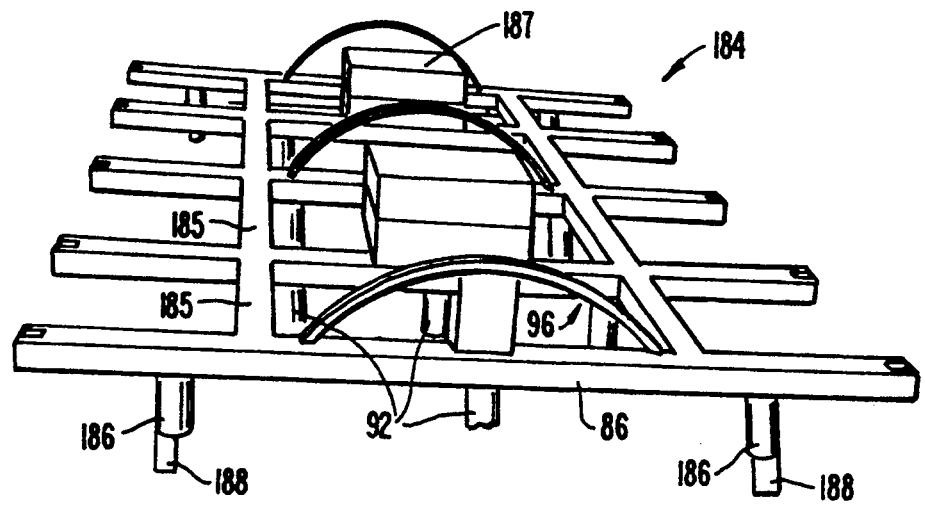
FIG._8.
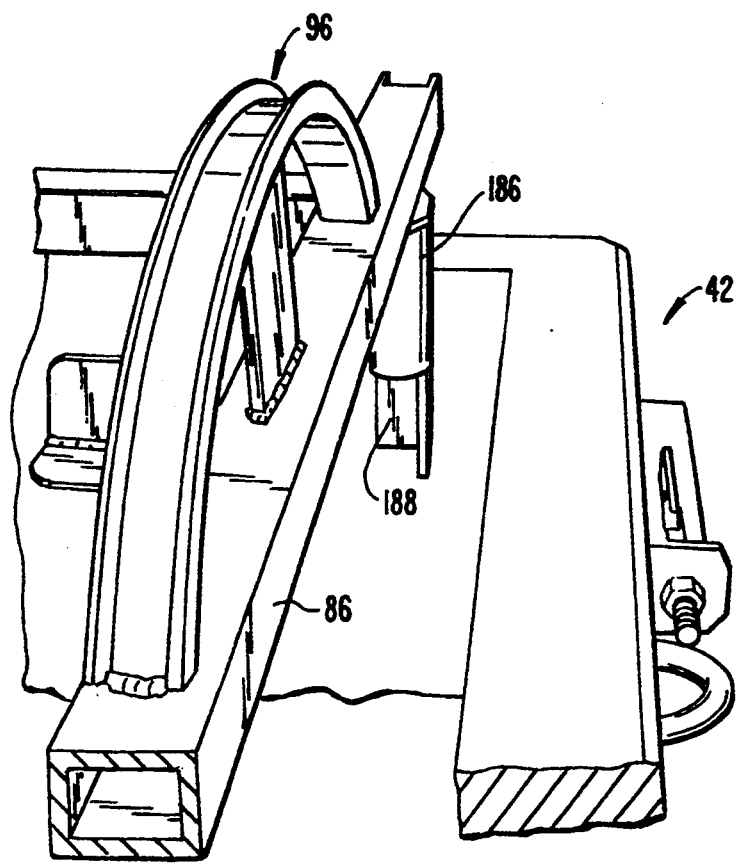
FIG._9.

METHOD FOR ENTOMBMENT OF CONTAINER IN CONCRETE

This is a continuation of application Ser. No. 07/888,413, filed May 21, 1992, now abandoned, which is a continuation of Ser. No. 07/541,004, filed Jun. 20, 1990, now abandoned, which is a continuation-in-part of Ser. No. 07/298,548, filed Mar. 9, 1989, now U.S. Pat. No. 4,963,082, which is a division of Ser. No. 07/118,919, filed Nov. 16, 1987, now U.S. Pat. No. 4,826,644, which is a continuation-in-part of Ser. No. 06/936,205, filed Dec. 1, 1986, now abandoned, the disclosure of each being incorporated by reference.

BACKGROUND OF THE INVENTION

There is a continuing interest in the safe containment of liquids, particularly gasoline and other fuels, because of the vast amount of fuel presently stored throughout the country. It has become increasingly apparent that underground storage tanks can and do leak, thus causing serious short-term and long-term problems. Therefore, many localities have chosen to examine all underground tanks, mostly fuel storage tanks, to determine if the tanks are leaking. It is an expensive process to inspect the tanks and test the earth surrounding the tanks for indications of leakage. Repair or replacement of tanks which are shown to be leaking increases the cost a great deal further.

Other liquids, in addition to fuels, create containment problems as well. Many liquids used in industry are hazardous from an environmental standpoint, from a safety standpoint, or both. Often these liquids are not suitable for storing in steel containers because of their corrosive or reactive properties. Although stainless steel can be used for certain chemicals, the use of large stainless steel tanks can be very expensive. Also, some chemicals are not suitable for storage in stainless steel tanks as well.

Many chemicals are now being stored in plastic and other non-metallic tanks. One such tank is made of cross-linked polyethylene, an environmentally stable material, by Poly Cal Plastics, Inc. of French Camp, Calif. as ZORB TANKS. However, even if such non-metallic tanks are chemically suitable for many types of chemicals, they are still susceptible to damage from extreme heat and fire, as well as physical damage which could create leaks.

To aid the detection and prevention of leaks, double wall (dual containment) tanks have been used for both underground and above ground storage. The space between the two walls of the tanks is monitored for leakage. When used underground, monitors can be used to sense both water seepage in and stored liquid seepage out. If a leak is detected, the tank can be drained and abandoned, dug up and removed, or repaired in place. These options are all quite expensive. If the contaminated soil surrounding the leaking tank must be removed, the expense increases dramatically. However, conventional double wall tanks are quite expensive and are not presently able to meet fire code standards for above-ground storage of flammable liquids. Therefore, even when dual containment tanks are used, flammable liquid is most often stored in below-ground tanks.

Creating a concrete encased hollow tank is not without problems. One conventional method of doing so, described in U.S. patent application Ser. No. 936,205 mentioned above, is to form an open-top hollow shell, place the tank within the hollow shell and then pour the top. However, this process creates cold joints which are possible sources of leaks and weak points in the structure. Therefore, a homogenous concrete shell, which would eliminate cold joints, would be preferable. Entombing a hollow tank in fluid concrete is hindered, if not prevented, by the fact that the hollow tank has a tendency to bob up or float within the fluid concrete. Although the tank could be filled with water to give it neutral buoyancy, this solution causes other problems, including difficulties arising from trying to remove all the water from the tank after the concrete has set.

SUMMARY OF THE INVENTION

The present invention is directed to a method and apparatus for entombing a tank or other container within a homogenous layer of concrete. The method is carried out using wall forms combineable to create a circumferential sidewall form which is mounted to a base plate. The wall forms are secured to one another and are laterally positioned on the base plate, preferably using hydraulic jacks. The sidewall form and base plate define an open-top enclosure within which the tank is positioned. Concrete is poured within the enclosure to surround the tank to create the concrete outer tank. One or more hold-down members are mounted over the tank in the enclosure. The hold-down members press on the top of the tank to keep the tank from floating while the concrete is fluid. The hold-down members keep the tank properly horizontally and vertically positioned within the form to ensure a proper concrete wall thickness is maintained.

In one embodiment the storage vault is created by wrapping the combination inner tank and spacer layer with a large sheet of polyethylene. The edges of the liner are gathered at the top of the tank so that any leaks from the inner tank are contained by the liner. The spacer layer encased, polyethylene liner wrapped, inner tank is then entombed within a layer of concrete, preferably reinforced concrete.

The outer tank preferably includes bottom supports. The bottom supports lift the tank a few inches above the support surface on which the tank rests to provide a visual inspection region between the bottom of the outer tank and the support surface so the user can visually monitor for leaks from the vault.

The spacer layer may be chosen so that if the liquid stored within the inner tank contacts the spacer layer, the spacer layer dissolves or "melts" thus permitting the leaked liquid to gather within a liquid collection region between the inner tank and the liner. A leak detection tube is used between the inner tank and liner to permit monitoring of the liquid collection region between the tube. This arrangement provides for maximum thermal insulation without sacrificing the ability to monitor for leaks. The spacer layer, being a good thermal insulator, provides further protection for the contents of the inner tank during fires. The added insulation also helps moderate the temperature swings of the liquid within the inner tank which aids the control of atmosphere pollution, as well as reducing safety risks. Since no air space needs to be provided between the inner and outer tanks for leak detection, pouring the concrete around the combination of the inner tank, spacer layer and liner is much simpler.

The use of reinforced concrete as the outer tank provides several advantages. The concrete provides a protective physical barrier for the inner tank, to protect the inner tank from physical damage, at a reasonable cost. The concrete outer tank also serves as an effective thermal barrier. By using an Underwriters Laboratories listed inner tank and the reinforced concrete outer tank, an above-ground storage vault suitable for use with flammable liquids is achieved.

The invention is transportable and can be used above ground to store flammable liquids. This allows the storage vault to be especially suited for temporary use at construction sites. The costs associated with burying tanks underground are also eliminated with the present invention. If desired, multiple storage vaults can be used and connected in parallel or in series according to the use requirements. Also, two or more inner tanks can be placed within a single outer tank.

Preferably the storage vault has a flat bottom. Unlike many prior art storage containers, which are spherical or cylindrical and must be supported on a stand, the invention needs no separate support stand. The invention is extremely stable and thus is quite resistant to damage from earthquakes.

With the present invention a flammable liquid can be stored safely above ground. This removes the tank from local regulations and codes dealing with monitoring below-ground storage tanks. The present invention still permits the user to effectively monitor for leaks before any contamination to the surrounding earth occurs. The ability to monitor the region between the primary and secondary containment vessels and the provision of skids or supports on the bottom of the storage vault so that the region beneath the outer tank can be visually inspected, provides a double measure of protection against damage to the environment.

The invention permits a user to store flammable fuels above ground while meeting environmental and safety requirements at a cost much less than comparable buried storage tanks.

The invention also permits the concrete outer tank to be made of a homogenous layer of concrete. This eliminates cold joints, which are created when concrete must be poured in several steps and allowed to harden between the pours.

Another aspect of the invention relates to the use of containers or tanks which are useful for holding various chemicals. These tanks are typically not metallic but are often made of plastic. When the inner tank is not to be subjected to internal pressurization during use, it may be desirable to entomb the plastic tank directly in the concrete. To do so the plastic tank is preferably pressurized, such as at 0.5 to 1.0 psi (0.034 to 0.069 bar), so the sides of the plastic tank bow outwardly somewhat to resist the inward pressure of the wet concrete. In such cases a greater number of hold-down members, such as 12 instead of 4, are used to distribute the load on the top of the plastic tank created by the large buoyant forces from the wet concrete.

In some cases non-metallic tanks, typically plastic, are to be subjected to positive internal pressures, such as 6 psi (0.41 bar), to eliminate the need to use pumps to remove the contents of the tank. Since plastic tanks tend to bow outwardly under internal pressurization, this would exert a pressure on the concrete layer. To eliminate this problem, the plastic tank can be mounted within an external framework which generally holds the walls of the tank in place. The framework-enclosed plastic tank is then placed within an intermediate barrier tank, which is preferably made of steel. The intermediate barrier tank is then sealed shut and is entombed as discussed above. The walls of the plastic tank between the framework members may bow outwardly when the tank is pressurized; however, the framework members are sized so that the plastic tank walls do not push against the walls of the intermediate barrier tank so to keep from exerting forces directly on the intermediate barrier tank. The external framework is sufficiently rigid to minimize or substantially eliminate exertion of pressurization forces from the plastic tank, through the external framework and to the intermediate barrier tank. This is expected to substantially eliminate tension forces on the concrete outer tank when the inner plastic tank is pressurized.

The inner plastic tank could be made of materials other than plastic, such as fiber glass construction or other resin impregnated structures. Also, the region between the inner and intermediate tanks can be monitored for leaks in addition to, or instead of, monitoring for leaks between the intermediate barrier tank and outer concrete tank.

Other features and advantages of the invention will appear from the following description in which the preferred embodiments have been set forth in detail in conjunction with the accompanied drawings.

BRIEF DESCRIPTION OF THE DRAWINGS

FIG. 1 is a side cross-sectional view showing a vault made according to the present invention.

FIG. 2 is an exploded cross-sectional view taken along line 2—2 of FIG. 1.

FIG. 3 is a schematic illustration showing a method for making the vault of FIG. 1.

FIG. 4 shows the inner tank of FIGS. 1-3 within the form assembly of FIG. 3.

FIG. 5 illustrates the internal reinforcing members of the inner tank of FIG. 4 allowing the tank to be used as a pressure vessel.

FIG. 6 is an exploded isometric view of a plastic tank assembly.

FIG. 7 is an isometric view of a further alternative embodiment of a vault made according to the invention with portions broken away to show the use of the plastic tank assembly of FIG. 6 enclosed within a steel tank which is entombed within a concrete tank.

FIG. 8 illustrates a hold-down assembly used when entombing a non-metallic tank and using special corner guides.

FIG. 9 is an enlarged view of the corner guide of FIG. 8.

DESCRIPTION OF THE PREFERRED EMBODIMENT

Referring now to FIGS. 1 and 2, a vault 2 is shown to include a steel inner tank 4 surrounded by a spacer layer 6 of polystyrene. Inner tank 4 and spacer layer 6 are entombed or encased within an outer tank 8. Outer tank 8 includes a concrete layer 10 strengthened by rebar 12, and a liquid impervious liner 14, preferably by a sheet of polyurethane film. Conventional fill and vent pipes 16 extend from inner tank 4. A leak detector tube 20 is positioned between inner tank 4 and liner 14 and terminates at a liquid collection region 22. Tube 20 permits leaks from inner tank 4 to be monitored as the leaking liquid collects within region 22.

Spacer layer 6 performs a dual function. Spacer layer 6 is a good thermal insulator so to insulate the contents of inner tank 4 from external heat sources, such as forest fires. In addition, spacer layer 6 helps keep the contents of inner tank 4 at a more uniform temperature than would otherwise exist. This helps reduce vapor pressures within inner tank 4 making the storage of liquids safer and reducing the potential for vapor leaks to the atmosphere. In addition, spacer layer 6 is chosen so that it melts or liquifies when the liquid within inner tank 4 contacts the material of the spacer layer. Typically, inner tank 4 will hold a liquid hydrocarbon fuel, such as gasoline or diesel fuel. By choosing a spacer layer 6 made of polystyrene, if the liquid within tank 4 leaks through and contacts spacer layer 6, polystyrene spacer layer 6 melts or dissolves thus creating an open region between inner tank 4 and outer tank 8 permitting the leaked hydrocarbon to collect at liquid collection region 22. This permits the leak to be quickly noticed through leak detector tube 20 using conventional methods.

As a further aid to detection of leaks, outer tank 8 includes bottom supports 24 which raise the bottom 26 of vault 2 above the support surface 28 to create an inspection region 30 between bottom 26 and support surface 28.

Turning now also to FIG. 3, a simplified view of the method for making vault 2 is shown. First, an appropriate inner tank 4 is selected and has a number of polystyrene panels 32 secured to the outer surface 34 of inner tank 4, typically by an adhesive. A large sheet 36 of a liquid impervious material, such as polyethylene film, is wrapped around the spacer layer encased inner tank. The edges 38 of sheet 36 are gathered over the top 40 of inner tank 4 so to create a second liquid barrier.

A concrete form assembly 42 is used to entomb the inner tank 4, spacer layer 6, liner 14 combination. Form assembly 42 includes a base plate 44, having a pair of openings 46, used to form bottom supports 24, and two L-shaped wall forms 48, 50. Wall forms 48, 50 constitute a sidewall form 51. After assembly of base plate 44 and wall forms 48, 50, a rebar cage 52 is placed within an enclosure 54 defined by wall forms 48, 50 and base plate 44. A layer 56 of concrete is then poured within enclosure 54 to cover base plate 44. The combination 58 of inner tank 4, spacer layer 6 and sheet 36, which creates liner 14, is then positioned within enclosure 54 on top of the still wet layer 56 of concrete. Additional concrete is then placed within the region 60, see FIG. 4, between combination 58 and wall forms 48, 50 sufficient to cover combination 58 and be generally level with top edge 62 of sidewall form 51. The specific construction of form assembly 42 will now be discussed with reference to FIG. 4, in particular the structure for keeping combination 58 from bobbing up out of the fluid concrete.

Form assembly 42, in addition to wall forms 48, 50 and base plate 44, includes a pair of form clamp assemblies 64 at opposite corners 66, 68 of sidewall form 51, a lateral positioning assembly 70 adjacent base plate 44 and a pair of hold-down assemblies 72 which keep inner tank 4 from floating within the concrete while it is fluid.

Clamp assemblies 64 each include an L-bracket 73, welded to sidewall form 51, and a chain 74, secured at one end to L-bracket 73 by an adjustment bolt 76. Chain 74 has a hook 78 at the other end which engages the corner of the adjacent wall form 48 or 50. Chain 74 is tightened using a chain binder 80 which allows the user to easily apply a strong clamping load on the two wall forms 48, 50. Adjustment bolt 76 can be used to provide any necessary fine adjustment to the tension in chain 74. 2It has been found that use of two L-shaped wall forms 48, 50 and four form clamp assemblies 64 allow wall form 50 to be easily but securely fastened together while ensuring the proper, in this rectangular, shape is maintained.

Lateral positioning assemblies 70 each include a jack block 82 welded to base plate 44 at a position spaced apart from wall forms 48, 50. A hydraulic jack 84 is mounted between each jack block 82 and the opposing side of wall forms 48, 50. Applying sufficient force on wall forms 48, 50 through the use of jacks 84 positions sidewall form 51 on base plate 44 and keeps the lower ends of sidewall form 51 from moving laterally outwardly due to the pressure of the concrete while it is still fluid.

Each hold-down assembly 72 includes an elongate hold-down bar 86 having chamfered ends 88 guided between vertical guide plates 90. Guide plates 90 are mounted to wall forms 48, 50 and extend above top edge 62. Hold-down bar 86 has a pair of downwardly extending hold-down tubes 92 depending from its bottom surface 94 and a strong back 96 mounted centrally above the top surface 102 of hold-down bar 86. Strong back 96 has an arcuate guide surface 98 and a pair of vertical guide plates 100. Hold-down assembly 72 includes a chain 104 having each end 106 secured to an anchor point 108 on jack block 82. Chain 104 passes from the jack block 82 on one side of form assembly 42, between vertical guides 90, across chamfered ends 88, over curved surface 98 of strong back 96 and down past the chamfered ends of hold-down bar 86 on the other side. Hold-down assembly 72, also includes a chain ratchet 110. Chain ratchet 110 is used to shorten the effective length of chain 104 thus forcing tubes 92 against the top 40 of inner tank 4.

Guide rings 114, each having an internal diameter slightly larger than the external diameter of tubes 92, are welded to top 40 at positions chosen to engage the lower ends of tubes 92. Once so engaged, lateral, as well as upward, movement of inner tank 4 within enclosure 54 is substantially eliminated.

Strong back 96 is used to strengthen hold-down assembly 72. Strong back 96 keeps hold-down bar 86 from bowing upwardly due to the upward force on the hold-down bar caused by tank 4 attempting to float when surrounded by fluid concrete.

Turning now to FIG. 5, an inner tank 4' is shown to include U-channel reinforcing members 130 welded to the inside surface 132 of inner tank 4' so that inner tank 4' may be used as a pressure vessel. Reinforcing members 130 form a number of hoops 134 circumscribing the interior of tank 4'. The ends 136 of inner tank 4' have vertically extending reinforcing members 130 mounted along their interior surfaces as well. Pairs of reinforcing members 130 are placed back to back at positions 138 along top 112 of inner tank 4' and at positions 140 along the bottom 142 of inner tank 4'. This provides extra strength along the central portion of tank 4'. A pair of lifting brackets 144 are welded to top 112 of tank 4' adjacent positions 138 to facilitate moving tank 4'.

A vault 2 made with an inner tank 4' can be used as a vacuum storage vessel to safely handle waste motor oil or crank case motor oil. The vault incorporating reinforced inner tank 4' could have a vacuum continuously applied to the inner interior of inner tank 4'. A hose (not shown) would then be used to connect inner tank 4' to the oil, or other liquid, to be disposed of. The waste oil so collected could then periodically be removed from the vault through the use of, for example, a mobile vacuum tank truck which can suck the waste oil directly out of the inner tank 4' and into the mobile tank. This would permit gasoline service stations, auto dealers, lube and oil change centers, among others, to safely and conveniently store the waste oil and grease in a safe, cost-effective manner. Even without creating a vacuum in the interior of a vault 2, vault 2 would still be useful for safely and inexpensively storing such waste oil, waste grease and other flowable materials, by pumping or pouring the waste material directly into the vault.

To use form assembly 42, base plate 44 is positioned on a, preferably, level support surface. Wall forms 48, 50 are positioned on base plate 44 and are fastened to one another by form clamp assemblies 64 at each corner 66, 68. Hydraulic jacks 84 are then operated to properly position sidewall form 51 on base plate 44 and keep the bottom of the sidewalls from kicking out due to the pressure of the fluid concrete. Rebar cage 52 is then placed within enclosure 54 and a layer 56 of concrete is poured into enclosure 54 to create bottom 26 of outer tank 8. Combination 58, see FIG. 3, is then lowered into enclosure 54 until it rests on layer 56 of concrete.

Hold-down bars 86 are then positioned over enclosure 54 and lower ends of tubes 92 are positioned within rings 114. Chains 104 are then placed over hold-down bar 86 and fastened to jack blocks 82 at anchor points 108. Chain ratchets 110 are used to tighten chains 104 sufficiently to place an appropriate force on hold-down bars 86. Concrete is then poured into enclosure 54 to entomb combination 58, with the exception of various fill and vent pipes 16 extending up through concrete outer tank 8. Note that layer 56 of concrete is still wet when the subsequent pour of concrete is made. This ensures a homogenous concrete layer 10 with no cold joints. Sidewall form 51 is then vibrated to settle the aggregate in the concrete. The top surface 120 of outer tank 8 is smoothed. Shear pins 122 can be used to keep hold-down bars 86 from moving upwardly past upper holes 124 in vertical guides 90.

Once the concrete has set sufficiently, chain ratchets 110 are actuated to loosen chains 104, shear pins 122 are removed from holes 124 and hold-down bars 86 are lifted upwardly to remove tubes 92 from the layer of concrete covering top 112 of inner tank 4. The holes left by removal of tubes 92 are filled with fresh concrete. After the concrete has cured sufficiently, side-wall form 51 is removed from vault 2 and vault 2 is separated from base plate 44.

The entombment of inner tank 4 could be accomplished in other ways as well. For example, inner tank 4 could be placed into form assembly 42 to rest on base plate 44. Concrete could be pumped into form assembly 42 through openings in base plate 44 to cause inner tank 4 to lift above the base plate, with the remaining procedure proceeding as above.

Some chemicals require specialized, expensive equipment to pump the chemicals from a holding tank through a line. With a vault 2 made to withstand pressurization, the air space above the free surface of the liquid within the vault may be pressurized to force the chemical from the vault without the chemical passing through a pump. Similarly, the chemical could be sucked into the vault 2 by placing the air space in the vault at a partial vacuum as well.

Some materials are not suitable for storage in a metal, typically steel, tank. Many chemicals are therefore stored in plastic tanks. Although possessing many advantages, plastic tanks are generally not nearly as strong or rigid as steel tanks. The present invention can be used with plastic (or other non-metallic) tanks if appropriate modifications are made. At FIG. 6 a plastic tank assembly 150 is shown to include a plastic tank 152 and an external framework 154. External framework 154 includes a set of upper and lower horizontal members 156, 158 formed from 3-inch or 4-inch U-channels welded together along their lengths. Vertical members 160 are welded to corresponding upper and lower horizontal members 156, 158 to create a number of circumferential rings 162. Rings 162 are secured together by horizontal side members 164.

External framework 154 is substantially completed as shown in FIG. 6 and then plastic tank 152 is moved into the interior of framework 154. After tank 152 is in position within framework 154, as shown in FIG. 7, the end-most horizontal member 166 is welded in place. This is necessary due to the location of a manhole protrusion 168 on tank 152. Manhole protrusion 168 may be plastic, metal or some other material. Also, an end bar 170 is welded in place in a position similar to the end bar 172 at the other end of external framework 154.

When assembled, plastic tank assembly 150 is placed into a steel tank 174, see FIG. 7, which is similar to steel tank 4. However, steel tank 174 has a top 176 with an opening (not shown) sized and positioned for receipt of manhole protrusion 168. Any gap between manhole protrusion 168 and the opening is sealed, such as using a silicone sealant, such as G.E. SILICONE II, Stock No. GE5090, which is apparently covered by U.S. Pat. Nos. 4,417,042 and 4,843,973. Plastic tank assembly 150 and steel tank 174 combine to act as an inner tank assembly 180 which can be entombed in the same manner as inner tank 4 to create a vault 182.

When inner tank assembly 180 is used, the user is provided with what can be considered a triple-wall tank structure with collection regions between plastic tank 152 and steel tank 174 and also between steel tank 174 and the concrete outer tank 183. Leaks can be monitored in either or both regions. If desired, polystyrene panels 32 and sheet 36 (not shown in Fig.. 7 for sake of clarity) may be eliminated, although at the expense of additional protection.

The use of steel tank 174 provides several functions. It keeps the wet concrete from pressing on plastic tank 152, which could potentially collapse the plastic tank. Steel tank 174 also acts as a protective barrier for plastic tank 152. In addition, by separating plastic tank 152 from steel tank 174, and thus from concrete outer tank 183, vault 182 can be used in a pressurized state. That is, providing a positive pressure to plastic tank 152 of about 6 psi (about 0.41 bar) permits the contents of the plastic tank to be forced out of the tank without the passage of the contents through a pump. Since many chemicals are quite damaging to pumps, making inner tank assembly 180 suitable for pressurization eliminates the need for using a pump to draw the chemical from assembly 180. Although it is expected that the walls of plastic tank 152 will bow outwardly between circumferential rings 162, side members 164 and end bars 170, 172, external framework 154 is configured so that plastic tank 152 will not touch steel tank 174. In fact, it is preferred that the maximum amount of deflection of the plastic tank be about one-third the distance between plastic tank 152 and steel tank 174. The use of external framework 154 thus substantially eliminates any exertion of internal pressure on steel tank 174 so that, in turn, steel tank 174 does not exert any pressure on concrete outer tank 183.

Tank 152 is preferably of the type made by Poly Cal Plastics, Inc. of French Camp, Calif. under the name Zorb Tanks. This tank is made of a cross-linked polyethylene to be environmentally stable and has a wall thickness of about ½ inch (about 12.7 mm) for sufficient strength. However, when exposed to sunlight, elevated temperatures and oxygen, the stability of the material is lessened. Of course, being a plastic, it is sensitive to excessive heat and fire as well. Therefore, the protection afforded by concrete outer tank 183, polystyrene panels 32 and steel tank 174 eliminates many of the shortcomings which otherwise exist with this or other plastic tanks.

Turning now to FIG. 8, a hold-down assembly 184, similar to hold-down assembly 72, is shown with like elements referred to by like reference numerals. Hold-down assembly 184 includes 12 hold-down tubes 92 instead of the four hold-down tubes shown in the embodiment of FIG. 4. Hold-down assembly 184 is more rigid than assembly 72 through the use of more hold-down bars 86, cross-bars 185 and stiffener tubes 187 welded to bars 86. This is so because hold-down assembly 184 is used when plastic tank 152 is entombed directly within the concrete without the use of external framework 154 or steel tank 174. Doing so helps distribute the forces exerted by hold-down assembly 184 on the top of plastic tank 152 due to the buoyant forces created by the fluid concrete.

Hold-down assembly 184 does not require the use of any sort of guide rings 114 as used with the embodiment of FIG. 4. Rather, corner hold-down tubes 186, shown in more detail in FIG. 9, each include a corner guide 188 extending downwardly therefrom, the corner guides engaging the four corners of plastic tank 152. Since hold-down assembly 184 is properly positioned with respect to the form assembly 42 with which it is used, plastic tank 152 is properly positioned by the guidance given by corner guides 188. Using corner guides appropriately configured to engage the corners or edges, of tank 152, or of any other tank used with the invention, eliminates the need for special guiding structure such as used with the embodiment of FIG. 4.

It is preferred that plastic tank 152 be pressurized above atmospheric pressure during direct entombment within the concrete. Doing so at relatively moderate pressures, for example about ½ to 2½ psi (about 0.035 bar to about 0.17 bar), causes tank 152 to expand slightly. This pressurization has been found to generally eliminate the need for internal bracing within tank 152.

The elevated pressure within tank 152 is preferably reduced after the concrete has set. This permits tank 152 to shrink back to its original shape. It is believed that a small space or gap is created between tank 152 and concrete layer 8. This space or gap forms an internal expansion region for tank 152 to accommodate subsequent pressurizations. This system of pressurization is disclosed in more detail in U.S. patent application Ser. No. 07/319,598 filed Mar. 6, 1989, now U.S. Pat. No. 4,931,235 issued Jun. 5, 1990, the disclosure of which is incorporated by reference.

Modification and variation can be made to the disclosed embodiments without departing from the subject of the invention as defined by the following claims. If desired, non-flammable liquids can be stored in vault 2. Although it is preferred to include rebar cage 52 as a part of outer tank 8, one need not necessarily do so. Inner tank 4, although in the preferred embodiment made of steel, could be made of other suitable material according to the particular liquid being contained and the environment. It is preferred that vault 2 have a flat bottom for stability. However, other shapes are also possible. Vertical force can be applied to inner tank 4 during curing of the concrete in ways not shown. For example, tubes 92 could be replaced by I-beams permanently mounted to inner tank 4 and left within concrete top 120. Also, by appropriately positioning fill and vent pipes 16, the tops of these pipes may be used to apply the necessary vertical force on inner tank 4 to keep the inner tank from floating before the concrete has set. One or both of chain binders 80 and chain ratchets 110 may be replaced by other suitable tightening devices, such as hydraulic push-pull jacks. Many different configurations of centering frame 154 could be used as well. Additional framework members could be used with external framework 154, such as between upper horizontal members 156 and between lower horizontal members 158. Plastic tank 152 could be made of other non-metallic materials.

What is claimed is:

1. A method for entombing a container within a homogenous layer of concrete comprising the following steps:
   selecting a container;
   selecting a concrete form sized to accept the container;
   placing the container within the concrete form;
   surrounding the container with concrete within the concrete form; maintaining the position of the container within the concrete form during at least part of and after the surrounding step, the maintaining step including the steps of:
      positioning a hold-down member above the container, the hold-down member including a container-engaging member;
      engaging the container by the container-engaging member; and
      securing the hold-down member in place relative to the form with the container-engaging member engaging the container to keep the container properly vertically and horizontally positioned within the form;
   allowing the concrete to set to create a homogenous layer of concrete entombing the container; and
   separating the form from the concrete entombed container.

2. The method of claim 1 wherein the container selecting step is carried out by selecting a container having corners.

3. The method of claim 1 wherein the container selecting step is carried out by selecting an inner container, enclosing the inner container within an external reinforcing framework, housing the inner container and external reinforcing framework therewith within an intermediate container and spacing the inner container from the intermediate container.

4. The method of claim 3 wherein the enclosing step includes the steps of sliding the container into the external framework and securing the container within the external framework.

5. The method of claim 3 wherein the enclosing step is carried out using an external framework having a plurality of vertically oriented circumferential ring members.

6. The method of claim 3 wherein the enclosing step is carried out using an external framework having members welded to one another.

7. The method of claim 1 wherein the surrounding step is carried out by first pouring a layer of concrete into the form prior to the placing step.

8. The method of claim 7 wherein the placing step includes the step of resting the container on the layer of concrete.

9. The method of claim 1 wherein the securing step includes connecting the hold-down member to the form.

10. The method of claim 1 wherein the engaging step is carried out using a container-engaging member having a plurality of hold-down tubes extending downwardly to engage the container.

11. The method of claim 1 further comprising the step of removing the container-engaging member from the container after the concrete has at least partially set.

12. The method of claim 11 further comprising the step of filling a hole, left by the container-engaging member in the at least partially set concrete, after the removing step.

13. The method of claim 12 wherein the filling step is carried out using concrete.

14. A method for producing a containment device for above-ground containment of liquids by entombing a container while permitting fluid communication into and out of said container, comprising:

providing a container which has an interior and a top, said container including at least a first conduit providing fluid communication with said interior of said container;

providing a form for holding concrete during setting, said form including sidewall means and a base;

positioning said container in said form in a horizontal position spaced from said form and in a vertical position spaced from said base to provide a space between said container and said form;

providing means for maintaining said container in said horizontal position without said maintaining means extending between said container and said sidewall means; and pouring an amount of concrete sufficient to fill the space between said container and said form and to cover said top of said container wherein all of said amount of concrete is poured before adjacent concrete has set, to entomb said container in a homogeneous layer of concrete while maintaining said container in said horizontal position during said pouring of said amount of concrete using said means for maintaining while said conduit extends through said layer of concrete to provide fluid communication through said layer of concrete with said interior of said container.

15. The method of claim 14, further comprising:
removing said means for maintaining to produce holes in said concrete; and
filling said holes.

16. The method of claim 15 wherein said filling step is carried out using concrete.

17. A method for entombing a container within a homogenous layer of concrete comprising the following steps:

selecting a non-metallic inner container;
enclosing the inner container within an external reinforcing framework;
housing the inner container and external reinforcing framework therewith within an intermediate container to create a container assembly;
spacing the inner container from the intermediate container using the external reinforcing framework;
selecting a concrete form sized to accept the container assembly;
placing the container assembly within the concrete form;
surrounding the container assembly with concrete within the concrete form;
maintaining the position of the container assembly within the concrete form during at least part of and after the surrounding step, the maintaining step including the steps of:
positioning a hold-down member above the container assembly, the hold-down member including a container-engaging member;
engaging the container assembly by the container-engaging member; and
securing the hold-down member in place relative to the form with the container-engaging member engaging the container assembly to keep the container assembly properly vertically and horizontally positioned within the form;
allowing the concrete to set to create a homogenous layer of concrete entombing the container assembly; and
separating the form from the concrete entombed container assembly.

18. A method for producing a containment device for above-ground containment of liquids by entombing a container while permitting fluid communication into and out of said container, comprising:

providing a container which has an interior and a top, said container including at least a first conduit providing fluid communication with said interior of said container;

providing a form for holding concrete during setting, said form including sidewall means and a base;

positioning said container in said form in a horizontal position spaced from said form and in a vertical position spaced from said base to provide a space between said container and said form;

providing means for maintaining said container in said vertical position; and pouring an amount of concrete sufficient to fill the space between said container and said form and to cover said top of said container wherein all of said amount of concrete is poured before adjacent concrete has set, to entomb said container in a homogeneous layer of concrete while maintaining said container in said horizontal and vertical position during said pouring of said amount of concrete using said means for maintaining while said conduit extends through said layer of concrete to provide fluid communication through said layer of concrete with said interior of said container.

19. A method for producing a containment device for above-ground containment of liquids by entombing a container while permitting fluid communication into and out of said container, comprising:

providing a container which has an interior and a top, said container including at least a first conduit providing fluid communication with said interior of said container;

providing a form for holding concrete during setting, said form including sidewall means and a base;

positioning said container in said form in a vertical position spaced from said base to provide a space between said container and said form;

providing means for maintaining said container in said vertical position without said maintaining means extending between said container and said sidewall means; and pouring an amount of concrete sufficient to fill the space between said container and said form and to cover said top of said container wherein all of said amount of concrete is poured before adjacent concrete has set to entomb said container in a homogeneous layer of concrete while maintaining said container in said vertical position during said pouring of said amount of concrete using said means for maintaining while said conduit extends through said layer of concrete to provide fluid communication through said layer of concrete with said interior of said container.

* * * * *